United States Patent
Wu et al.

(10) Patent No.: US 11,343,892 B2
(45) Date of Patent: May 24, 2022

(54) LIGHT SOURCE SYSTEM, DRIVER AND OPERATING METHOD THEREOF

(71) Applicant: DELTA ELECTRONICS, INC., Taoyuan (TW)

(72) Inventors: Tsung-Ta Wu, Taoyuan (TW); Qi-Rong Lee, Taoyuan (TW); Wei-Cheng Chiu, Taoyuan (TW); Yu-Yung Huang, Taoyuan (TW); Ching-Ho Chou, Taoyuan (TW)

(73) Assignee: DELTA ELECTRONICS INC., Taoyuan (TW)

( * ) Notice: Subject to any disclaimer, the term of this patent is extended or adjusted under 35 U.S.C. 154(b) by 0 days.

(21) Appl. No.: 17/178,260

(22) Filed: Feb. 18, 2021

(65) Prior Publication Data
US 2022/0061137 A1    Feb. 24, 2022

(30) Foreign Application Priority Data
Aug. 19, 2020   (CN) ......................... 202010837697.3

(51) Int. Cl.
*H05B 45/30* (2020.01)
*H05B 45/355* (2020.01)
*H05B 47/165* (2020.01)
*H05B 45/40* (2020.01)
*H05B 45/325* (2020.01)

(52) U.S. Cl.
CPC ......... *H05B 45/355* (2020.01); *H05B 45/325* (2020.01); *H05B 45/40* (2020.01); *H05B 47/165* (2020.01)

(58) Field of Classification Search
CPC ........ H05B 45/24; H05B 45/30; H05B 45/37; H05B 45/39; H05B 45/44; H05B 45/325; H05B 45/382; H05B 45/385
See application file for complete search history.

(56) References Cited

U.S. PATENT DOCUMENTS

| | | | |
|---|---|---|---|
| 9,898,026 B2 | 2/2018 | Ewing et al. | |
| 2007/0024213 A1* | 2/2007 | Shteynberg | H05B 45/3725 315/291 |

(Continued)

FOREIGN PATENT DOCUMENTS

| | | |
|---|---|---|
| CN | 107947154 A | 4/2018 |
| CN | 108627688 A | 10/2018 |

(Continued)

*Primary Examiner* — Tung X Le
(74) *Attorney, Agent, or Firm* — CKC & Partners Co., LLC

(57) ABSTRACT

A driver is configured to provide an output voltage and an output current to a load according to an input voltage. The driver includes a power converter, first and second detecting devices and a controller. The power converter is configured to receive and convert the input voltage to the output voltage and the output current. The first detecting device is configured to detect the input voltage to generate a first signal. The second detecting device is configured to detect the output voltage to generate a second signal, and detect the output current to generate a third signal. The controller is configured to perform a calculation to the second signal and the third signal according to one of lookup tables corresponding to the first signal to generate a power value. An operation method of a driver and a light source system are also disclosed herein.

16 Claims, 7 Drawing Sheets

(56) References Cited

U.S. PATENT DOCUMENTS

| | | | |
|---|---|---|---|
| 2009/0306914 A1 | 12/2009 | Cohen | |
| 2010/0026208 A1* | 2/2010 | Shteynberg | H05B 45/3725 |
| | | | 315/297 |
| 2011/0085576 A1* | 4/2011 | Crawford | H05B 45/44 |
| | | | 372/38.07 |
| 2011/0169426 A1* | 7/2011 | Sadwick | H05B 41/3927 |
| | | | 315/307 |
| 2013/0162157 A1* | 6/2013 | Suzuki | H05B 45/385 |
| | | | 315/201 |
| 2014/0028211 A1* | 1/2014 | Imam | H02M 3/33507 |
| | | | 315/200 R |
| 2015/0208479 A1* | 7/2015 | Radermacher | H05B 45/00 |
| | | | 315/307 |
| 2018/0124890 A1* | 5/2018 | DeJonge | H05B 45/14 |

FOREIGN PATENT DOCUMENTS

| | | |
|---|---|---|
| CN | 110641317 A | 1/2020 |
| CN | 110855013 A | 2/2020 |
| TW | M398119 U1 | 2/2011 |

* cited by examiner

LIGHT SOURCE SYSTEM, DRIVER AND OPERATING METHOD THEREOF

CROSS-REFERENCE TO RELATED APPLICATION

This application claims priority to China Application Serial Number 202010837697.3, filed Aug. 19, 2020, which is herein incorporated by reference in its entirety.

BACKGROUND

Field of Invention

The present invention relates to a driving technology. More particularly, the present invention relates to an operating method of a driver.

Description of Related Art

Under the current trend of energy conservation and carbon reduction, various electric systems including, for example, intelligence light control systems need to monitor power consumptions to perform controlling according to the power consumptions. Current practices include two methods: (1) Installing an electric meter directly on the external of the system to measure the power consumption of the system. (2) Integrating an electric meter integrated circuit (IC) in the internal of the system, installing the electric meter IC at a primary side to calculate the power consumption of the system and transmitting the power consumption to a microcontroller unit (MCU) via an internal communication interface. However, device/element costs and the installation costs of the two methods are more expensive. Thus, developments of related technology to overcome problems described above are important topics in this field.

SUMMARY

The present disclosure provides a driver configured to provide an output voltage and an output current to a load according to an input voltage. The driver includes a power converter, a first detecting device, a second detecting device and a controller. The power converter is configured to receive the input voltage and convert the input voltage to the output voltage and the output current. The first detecting device configured to detect the input voltage to generate a first signal. The second detecting device configured to detect the output voltage to generate a second signal, and detect the output current to generate a third signal. The controller configured to perform a calculation to the second signal and the third signal according to one of lookup tables corresponding to the first signal to generate at least one power value.

The present disclosure provides an operating method of a driver including: converting an input voltage to an output voltage and an output current by the driver; driving a load by the output voltage and the output current; detecting the input voltage, the output voltage and the output current; generating a first signal, a second signal and a third signal corresponding to the input voltage, the output voltage and the output current, respectively; selecting a first lookup table in a plurality of lookup tables according to the first signal; searching in the first lookup table according to the second signal and the third signal to generate at least one power value.

The present disclosure provides a light source system including a light emitting diode string and a driver. The driver is coupled to the light emitting diode string, and configured to receive an input voltage to provide an output voltage and an output current to drive the light emitting diode string. The driver includes a power converter, a first detecting device, a second detecting device and a controller. The power converter is configured to receive the input voltage and convert the input voltage to the output voltage and the output current. The first detecting device configured to detect the input voltage to generate a first signal. The second detecting device configured to detect the output voltage to generate a second signal, and detect the output current to generate a third signal. The controller configured to perform a calculation to the second signal and the third signal according to one of lookup tables corresponding to the first signal to generate at least one power value.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
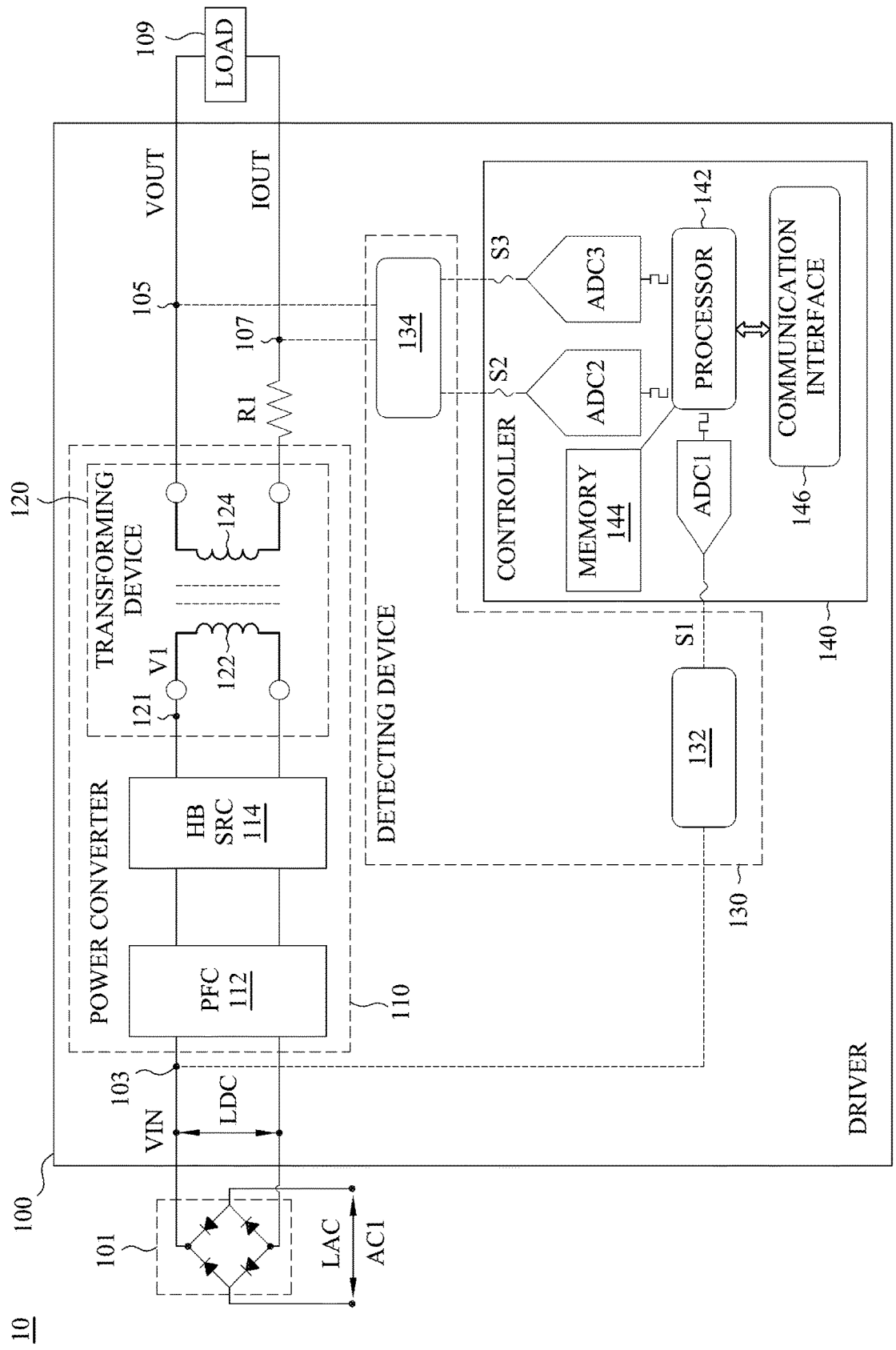
FIG. 1 is a functional block diagram of a light source system illustrated according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a functional block diagram of a light source system illustrated according to one embodiment of this invention. As illustratively shown in FIG. 1, a light source system 10 includes a driver 100, a bridge rectifier 101 and a load 109.

Furthermore, as illustratively shown in FIG. 1, the driver 100 is configured to receive a voltage signal VIN, and output a voltage signal VOUT and a current signal IOUT to drive the load 109 performing operations. In the embodiment illustrated by FIG. 1, the driver 100 is coupled to the bridge rectifier 101, and configured to receive the voltage signal VIN from the bridge rectifier 101. The bridge rectifier 101 is configured to receive an alternating current (AC) voltage signal AC1, and output the voltage signal VIN according to the AC voltage signal AC1. The AC voltage signal AC1 has a voltage level LAC, the voltage signal VIN has a voltage level LDC.

In some embodiments, the voltage level LDC depends on the voltage level LAC. For example, the voltage level LDC is proportional to the voltage level LAC. In some embodiments, the driver 100 is configured to drive the load 109 according to the voltage signal VOUT and the current signal IOUT. In which in some embodiments, the load 109 includes a light emitting diode (LED) string, but embodiments of the present disclosure are not limited to this. The driver 100 can also be configured to drive other types of devices. In some embodiments, the driver 100 is included in an intelligence light control system.

As illustratively shown in FIG. 1, the driver 100 includes a power converter 110, a transforming device 120, a detecting device 130 and a controller 140. In some embodiments, the power converter 110 includes the transforming device 120, and is configured to receive and convert the voltage signal VIN, and output a voltage signal V1 to the transforming device 120. The transforming device 120 is configured to receive the voltage signal V1 and output the voltage signal VOUT and the current signal IOUT. In other words, the power converter 110 is configured to receive the voltage signal VIN, and convert the voltage signal VIN to the voltage signal VOUT and the current signal IOUT. The detecting device 130 is configured to detect the voltage signal VIN, the voltage signal VOUT and the current signal IOUT, and transmits a signal S1 corresponding to the voltage signal VIN, a signal S2 corresponding to the voltage signal VOUT and a signal S3 corresponding to the current signal IOUT to the controller 140. The controller 140 is configured to receive the signals S1-S3, and perform calculations according to the signals S1-S3 and pre-stored lookup tables including, for example, Table 1, to generate power values of the driver 100 including, for example, the power values of an apparent power, an active power and a load side power.

In some embodiments, the controller 140 is implemented by a microcontroller unit (MCU) or a single chip microcomputer or other types of devices having calculating and storing functions. In some embodiments, the driver 100 further includes a resistor R1 configured to measure a current value of the current signal IOUT.

In some embodiments, the power converter 110 includes a power factor correction (PFC) circuit 112 and a half bridge series resonant converter (HBSRC) circuit 114. The PFC circuit 112 and the HBSRC circuit 114 are configured to improve stability and power consuming efficiency of the driver 100.

In some embodiments, the transforming device 120 includes a primary side winding 122 and a secondary side winding 124. The primary side winding 122 is configured to transmit the voltage signal V1 to the secondary side winding 124. The secondary side winding 124 is configured to convert the voltage signal V1 to output the voltage signal VOUT and the current signal IOUT. Due to the voltage signal VOUT and the current signal IOUT are the voltage signal and the current signal corresponding to secondary side winding 124, the voltage signal VOUT and the current signal IOUT are referred as a secondary side voltage signal and a secondary side current signal. In some embodiments, the primary side winding 122 and the secondary side winding 124 are implemented by coils or other types of winding elements.

In some embodiments, the detecting device 130 includes a detecting element 132 and a detecting element 134. The detecting element 132 is configured to receive the voltage signal VIN, generate the corresponding signal S1 according to the voltage signal VIN, and transmit the signal S1 to the controller 140 by an isolated transmitting mode or a non-isolated transmitting mode. Similar to the detecting element 132, the detecting element 134 is configured to receive the voltage signal VOUT and the current signal IOUT, generate the corresponding signals S2 and S3 according to the voltage signal VOUT and the current signal IOUT, and transmit the signals S2 and S3 to the controller 140 by the isolated transmitting mode or the non-isolated transmitting mode. Details associated to the isolated transmitting mode and the non-isolated transmitting mode are described below in the embodiments associated with FIG. 2-FIG. 5.

In some embodiments, the controller 140 includes a processor 142, a memory 144 and a communication interface 146. The processor 142 is configured to receive the signals S1-S3, search a power factor value PF and an efficiency value EFF in lookup tables prestored in the memory 144 according to the signals S1-S3, and then calculate a load side power value P1, an active power value P2 and an apparent power value P3. The power factor value PF and the efficiency value EFF correspond to a voltage value K1 of the voltage signal VIN, a voltage value K2 of the voltage signal VOUT and a voltage value K3 of the current signal IOUT. Equations associated with the load side power value P1, the active power value P2 and the apparent power value P3 are following:

$$P1 = K2 \times K3;$$

$$P2 = K2 \times K3 / EFF;$$

$$P3 = K2 \times K3 / EFF / PF.$$

In some embodiments, the communication interface 146 is a digital communication interface, serial peripheral interface (SPI), inter-integrated circuit (I2C) or other types of communication interfaces. In some embodiments, a standard apparatus (e.g. WT1600 Digital Power Meter) measures the power factor values PF and the efficiency values EFF corresponding to different voltage values K2 and current values K3, and establishes lookup tables including, for example, lookup tables T1-T3 in FIG. 7, according to the voltage values K1 and K2, the current values K3, the power factor values PF and the efficiency values EFF. The different voltage values K2 and the current values K3 are corresponding to different voltage signals VOUT and current signals IOUT generated by the driver 100 under different voltage signal values K1 of different voltage signals VIN.

In some embodiments, the controller 140 further includes analog-to-digital converters ADC1-ADC3. The analog-to-digital converters ADC1-ADC3 are configured to convert the signals S1-S3 to the corresponding voltage values K1, K2 and the current value K3, respectively, to transmit the voltage values K1, K2 and the current value K3 to the processor 142.

In some embodiments, the communication interface 146 is configured to receive and display the load side power value P1, the active power value P2 and the apparent power value P3, such that users can refer and monitor situations of the driver 100 consuming electric power according to the load side power value P1, the active power value P2 and the apparent power value P3.

In previous approaches, an electric meter needs to be installed at a primary side of a driver to calculate the electric power consumption, such that the cost is increased.

Comparing to previous approaches, embodiments of the present disclosure estimate power values of the driver 100 by the voltage value K1, K2 and the current value K3 and the lookup tables stored in the memory 144 of the controller 140. The installation of an additional electric meter is not necessary, such that the cost is reduced. Furthermore, embodiments of the present disclosure include methods of transmitting the signals S1-S3 corresponding to the voltage value K1, K2 and the current value K3 by the isolated transmitting mode and the non-isolated transmitting mode.

Figure 2:
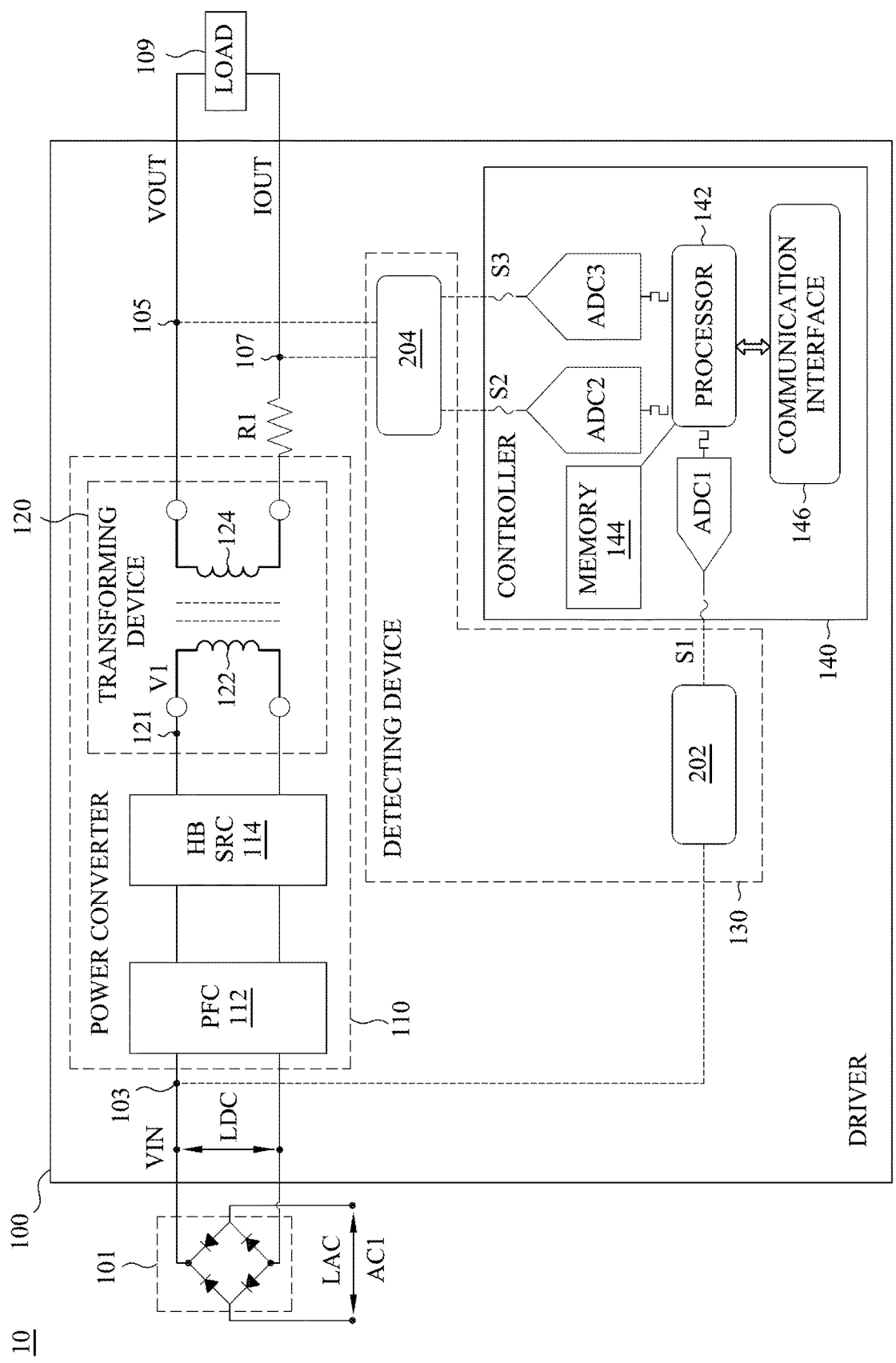
FIG. 2 is a functional block diagram of a light source system illustrated according to one embodiment of this invention.

FIG. 2 is a functional block diagram of a light source system illustrated according to one embodiment of this invention. FIG. 2 is roughly the same with FIG. 1, and thus descriptions of same parts with FIG. 1 are not repeated. Differences between FIG. 2 and FIG. 1 include that the detecting device 130 in FIG. 2 includes a detecting element 202 and a detecting element 204. The detecting element 202 and the detecting element 204 are embodiments of the detecting element 132 and the detecting element 134 in FIG. 1, respectively. The detecting element 202 is configured to transmit the signal S1 to the controller 140 via the non-isolated transmitting mode. The detecting element 204 is configured to transmit the signals S2 and S3 to the controller 140 via the isolated transmitting mode.

In some embodiments, the detecting element 202 includes a voltage divider circuit coupled between a node 103 and the controller 140, corresponding to the non-isolated transmitting mode. In some embodiments, the detecting element 204 includes a voltage divider circuit and an optical coupler, corresponding to the isolated transmitting mode. In some embodiments, the controller 140 is configured at a primary side (for example, the node 103) of the power converter 110. The controller 140 is configured to receive the corresponding signal S1 by the detecting element 202, and receive the signals S2 and/or S3 corresponding to a secondary side (for example, the node 105 and/or the node 107) of the power converter 110 with the isolated transmitting mode by the detecting element 204.

Figure 3:
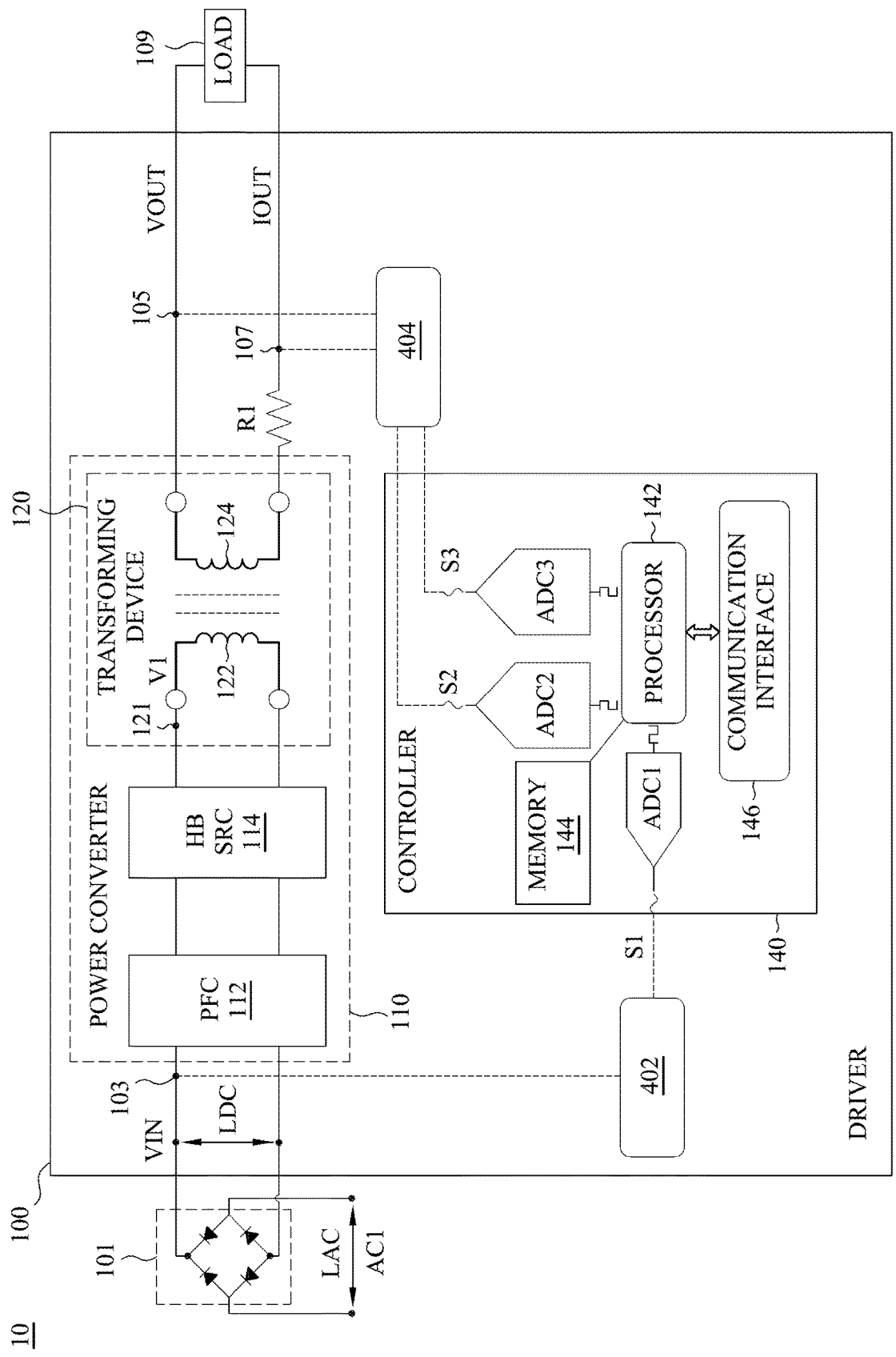
FIG. 3 is a functional block diagram of a light source system illustrated according to one embodiment of this invention.

FIG. 3 is a functional block diagram of a light source system illustrated according to one embodiment of this invention. FIG. 3 is roughly the same with FIG. 1, and thus descriptions of same parts with FIG. 1 are not repeated. Differences between FIG. 3 and FIG. 1 include that the detecting device 130 in FIG. 3 includes a detecting element 402 and a detecting element 404. The detecting element 402 and the detecting element 404 are embodiments of the detecting element 132 and the detecting element 134 in FIG. 1, respectively. The detecting element 402 is configured to transmit the signal S1 to the controller 140 via the isolated transmitting mode. The detecting element 204 is configured to transmit the signals S2 and S3 to the controller 140 via the non-isolated transmitting mode.

In some embodiments, the detecting element 404 includes a voltage divider circuit coupled between a node 105 and the controller 140, corresponding to the non-isolated transmitting mode. In some embodiments, the detecting element 402 includes a voltage divider circuit and an optical coupler, corresponding to the isolated transmitting mode. In some embodiments, the controller 140 is configured at a secondary side (for example, the node 105 and/or the node 107) of the power converter 110. The controller 140 is configured to receive the corresponding signals S2 and/or S3 by the detecting element 404, and receive the signal S1 corresponding to a primary side (for example, the node 103) of the power converter 110 with the isolated transmitting mode by the detecting element 402.

Figure 4:
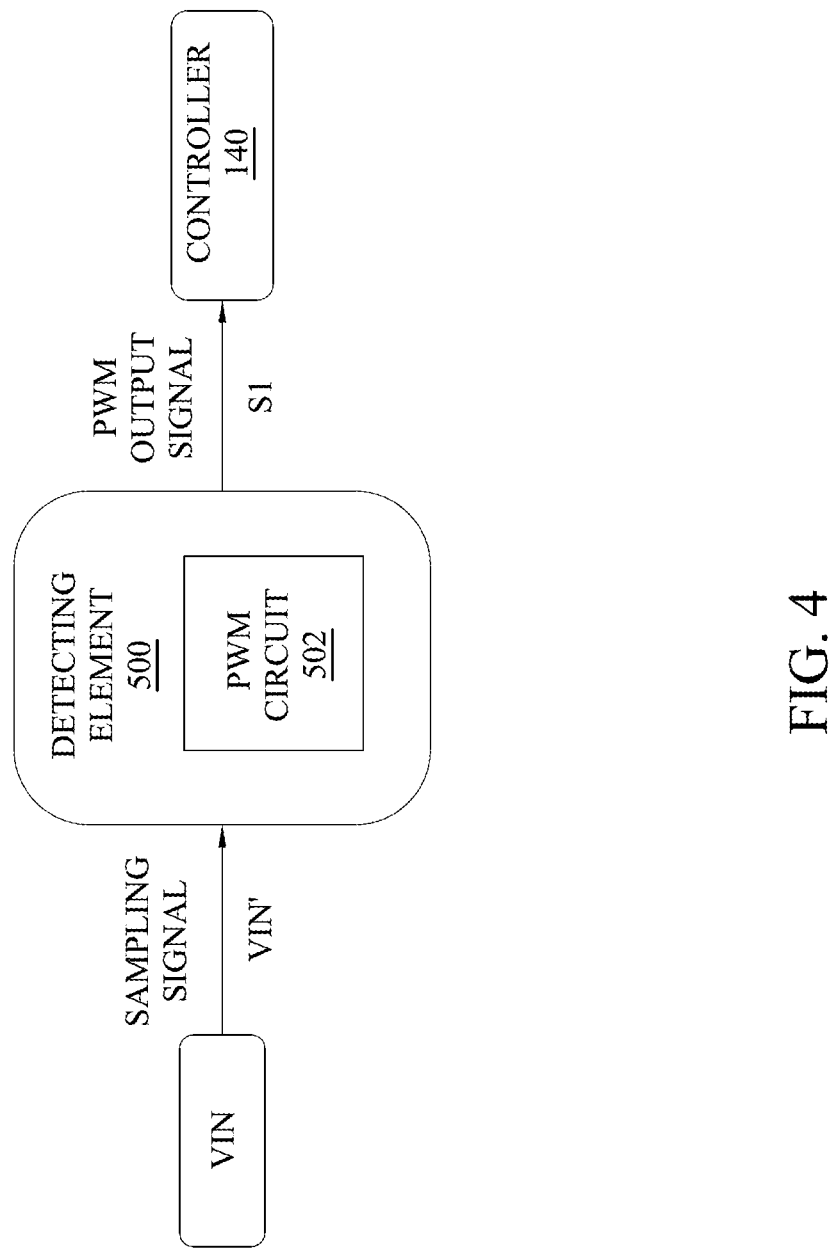
FIG. 4 is a schematic diagram of operations of a detecting element and a controller illustrated according to one embodiment of this invention.

FIG. 4 is a schematic diagram of operations of a detecting element and controller illustrated according to one embodiment of this invention. In the embodiment illustratively shown in FIG. 4, a detecting element 500 includes a pulse width modulation (PWM) circuit 502. In some embodiments, the detecting element 500 is an example of the detecting element 202 in FIG. 2, and the PWM circuit 502 is an isolated mode PWM circuit. In some other embodiments, the detecting element 500 is an example of the detecting element 402 in FIG. 3, and the PWM circuit 502 is a non-isolated mode PWM circuit.

In the embodiment illustratively shown in FIG. 4, the PWM circuit 502 performs sampling to the voltage signal VIN to obtain a sampling voltage signal VIN' corresponding to the voltage signal VIN, and convert the sampling voltage signal VIN' to the signal S1 having pulses, and output the signal S1 to the controller 140.

Figure 5:
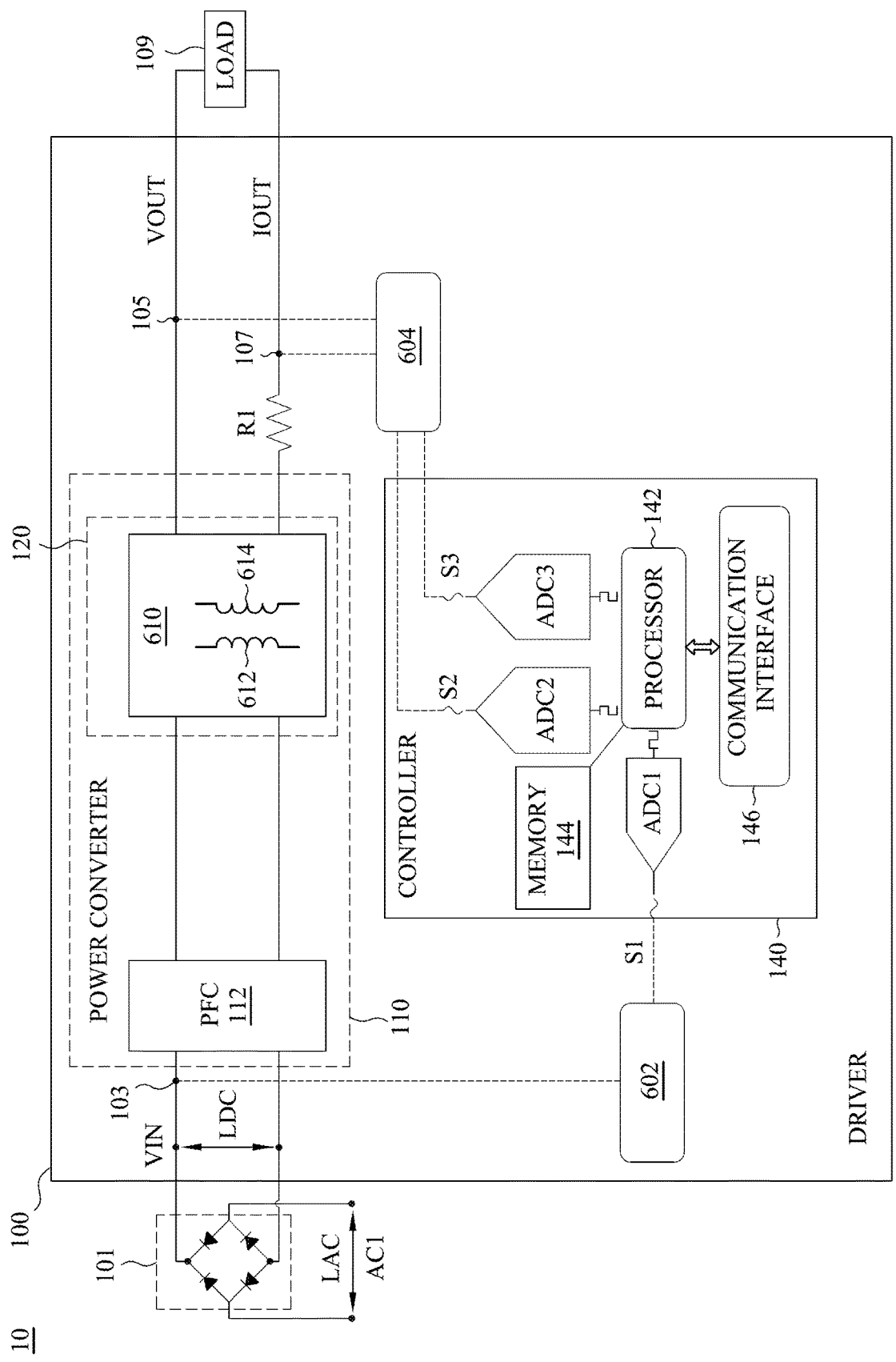
FIG. 5 is a functional block diagram of a light source system illustrated according to one embodiment of this invention.

FIG. 5 is a functional block diagram of a light source system illustrated according to one embodiment of this invention. FIG. 5 is roughly the same with FIG. 1, and thus descriptions of same parts with FIG. 1 are not repeated. Differences between FIG. 5 and FIG. 1 include that the detecting device 130 in FIG. 5 includes a detecting element 602 and a detecting element 604. The detecting element 602 and the detecting element 604 are embodiments of the detecting element 132 and the detecting element 134 in FIG. 1, respectively. The detecting element 602 is configured to transmit the signal S1 to the controller 140 via the non-isolated transmitting mode. The detecting element 604 is configured to transmit the signals S2 and S3 to the controller 140 via the non-isolated transmitting mode.

Furthermore, the differences between FIG. 5 and FIG. 1 include that the transforming device 120 includes a buck converter 610 in the embodiment illustratively shown in FIG. 5. The buck converter 610 is configured to adjust the voltage signal V1 to the voltage signal VOUT. The buck converter 610 includes a primary side winding 612 and a secondary side winding 614. The primary side winding 612 is configured to receive the voltage signal V1. The secondary side winding 614 is configured to output the voltage signal VOUT and the current signal IOUT.

In some embodiments, the detecting element 602 includes a wire coupled between the node 103 and the controller 140. The detecting element 604 includes a wire coupled between the node 105 and the controller 140, and a wire coupled between the node 107 and the controller 140.

Figure 6:
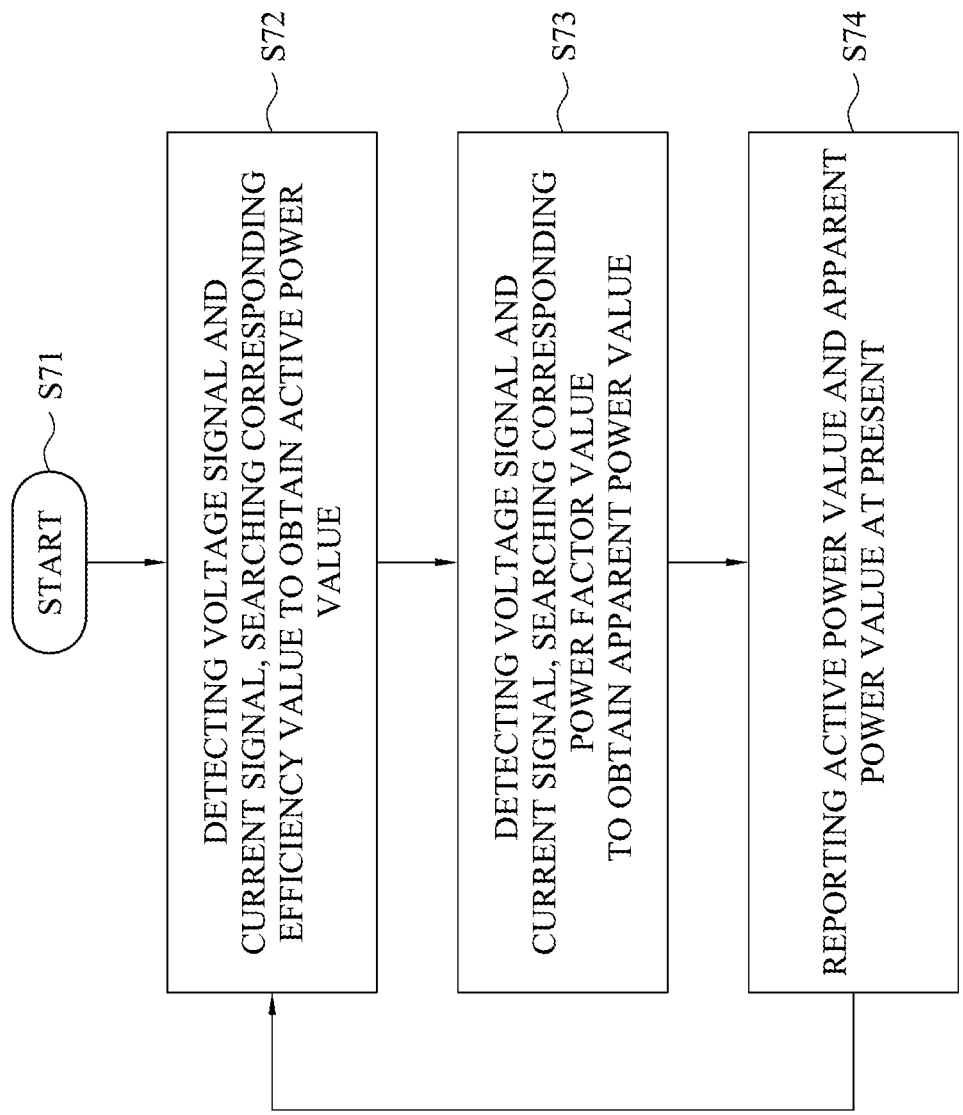
FIG. 6 is a flow chart of an operating method of a driver illustrated according to one embodiment of this invention.

FIG. 6 is a flow chart of an operating method of a driver illustrated according to one embodiment of this invention. In some embodiments, the operating method illustrated in FIG. 6 can apply to the drivers 100 illustratively shown in FIG. 1, FIG. 2, FIG. 3 and FIG. 5. Reference is made to FIG. 6. Operations of the driver 100 start at operation S71. At operation S72, the driver 100 detects the voltage signals VIN, VOUT and the current signal IOUT, searches the corresponding efficiency value EFF in a lookup table according to the corresponding voltage values K1, K2 and the current value K3, and performs calculation according to the efficiency value EFF to obtain the active power value P2. At operation S73, the driver 100 searches the corresponding power factor value PF in the lookup table according to the corresponding voltage values K1, K2 and the current value K3, and performs calculation according to the power factor value PF to obtain the apparent power value P3. At operation S74, the driver 100 reports the active power value P2 and the apparent power value P3 of the driver 100 at present by the communication interface 146.

In some embodiments, after the operation S74, the driver repeats the operations from the operation S72 to keep monitoring the power values of the driver 100. In some embodiments, the driver 100 repeats the operations from the operation S72 to the operation S74 once per second.

Figure 7:
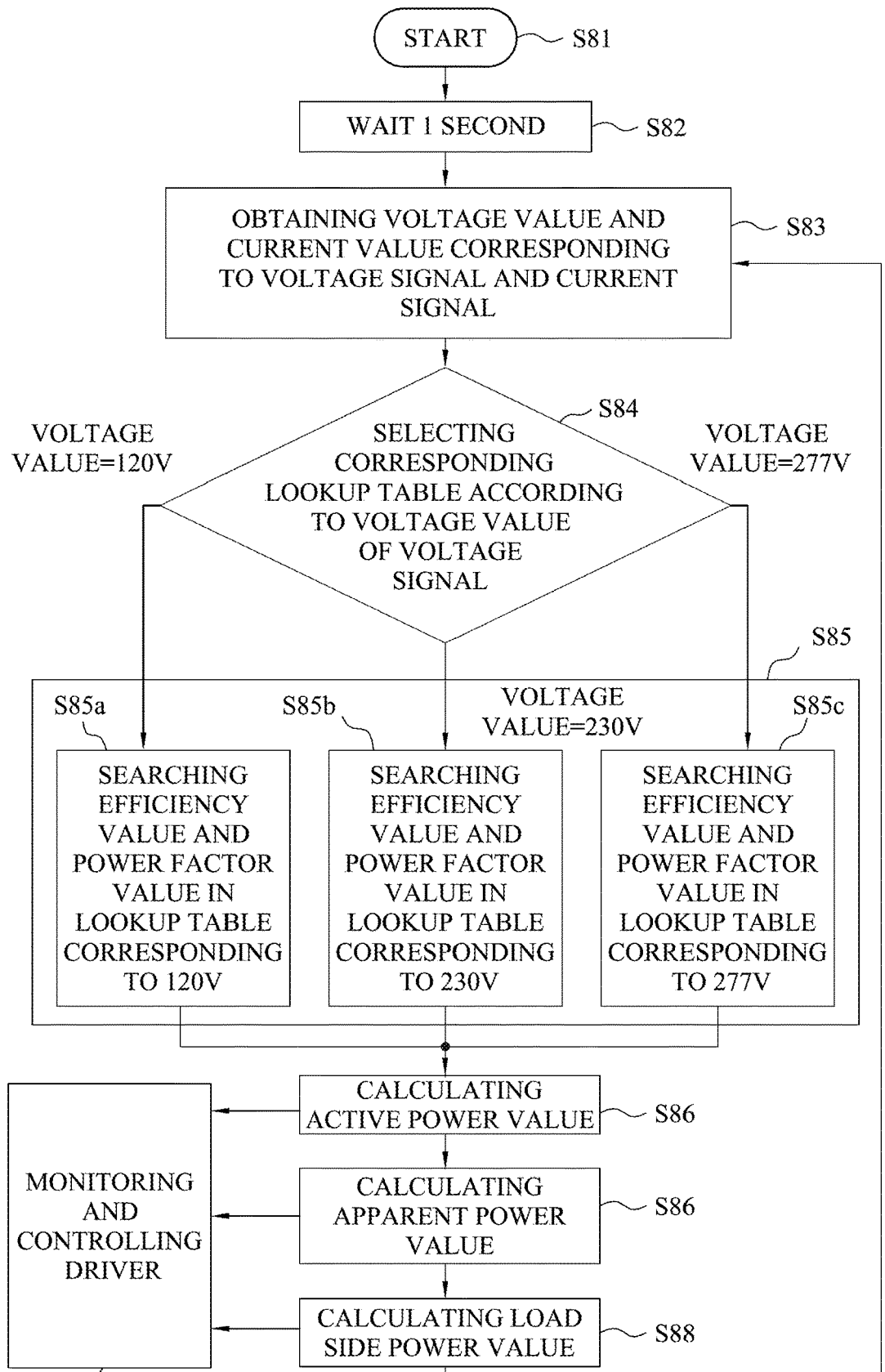
FIG. 7 is a flow chart of an operating method of a driver illustrated according to one embodiment of this invention.

FIG. 7 is a flow chart of an operating method of a driver illustrated according to one embodiment of this invention. In some embodiments, the operating method illustrated in FIG. 7 can apply to the drivers 100 illustratively shown in FIG. 1, FIG. 2, FIG. 3 and FIG. 5. Reference is made to FIG. 7. Operations of the driver 100 start at operation S81. At operation S82, the driver 100 waits for one second. At operation S83, the driver 100 obtains the voltage values K1, K2 and the current value K3 corresponding to the voltage signals VIN, VOUT and the current signal IOUT. At operation S84, the driver 100 selects a corresponding lookup table according to the voltage value K1 of the voltage signal VIN.

At operation S85, the driver 100 searches the corresponding power factor value PF and the corresponding efficiency value EFF according to the voltage value K2 of the voltage signal VOUT and the current value K3 of the current signal IOUT. At operation S85a, if the voltage value K1 is 120V, then the driver 100 searches the power factor value PF and the efficiency value EFF in a lookup table T1 (not shown) corresponding to 120V. At operation S85b, if the voltage value K1 is 230V, then the driver 100 searches the power factor value PF and the efficiency value EFF in a lookup table T2 (not shown) corresponding to 230V. At operation S85c, if the voltage value K1 is 277V, then the driver 100 searches the power factor value PF and the efficiency value EFF in a lookup table T3 (not shown) corresponding to 277V. It should be understood that the voltage values of K1 are for examples only, and are not intended to limit the present disclosure.

At operation S86, the driver 100 calculates the active power value P2 according to the voltage value K2, the current value K3 and the efficiency value EFF. At operation S87, the driver 100 calculates the apparent power value P3 according to the voltage value K2, the current value K3, the efficiency value EFF and the power factor value PF. At operation S88, the driver 100 calculates the load side power value P1 according to the voltage value K2 and the current value K3.

At operation S89, users monitor and control the voltage signal VIN and the AC voltage signal AC1 of the driver 100 according to the load side power value P1, the active power value P2 and the apparent power value P3 obtained according to operations S86-S88. For example, the load side power value P1, the active power value P2 and the apparent power value P3 calculated by the processor 142 are transmitted to the users via the communication interface 146, such that the users can refer and monitor situations of the driver 100 consuming electric power according to the load side power value P1, the active power value P2 and the apparent power value P3.

In some embodiments, after the operation S88, the driver 100 repeats the operations from the operation S83 to keep monitoring the power values of the driver 100. In some embodiments, the driver 100 waits for a period of time before the operations start again from the operation S83.

In some embodiments, the voltage values corresponding to the lookup tables T1-T3 can be voltage value ranges. For example, a range of the voltage value K1 corresponding to the lookup table T1 is 100V-150V, a range of the voltage value K1 corresponding to the lookup table T2 is 150V-220V, and a range of the voltage value K1 corresponding to the lookup table T3 is 220V-297V. The voltage value ranges corresponding to the lookup tables T1-T3 covers 100V-297V, and thus the corresponding power factor value PF and the corresponding efficiency value EFF can be found when the voltage value K1 is in the range of 100V-297V. It should be noted that a number of lookup tables (for example, the lookup tables T1-T3) and the ranges of the corresponding voltage values K1, K2 and the current value K3 are for example only, which can be adjusted according to actual conditions, and are not intended to limit the present disclosure.

Table 1 is an embodiment of the lookup table T1 corresponding to the voltage value K1 between 100V-150V. As shown in Table 1, when the voltage value K1 is 120V, the driver 100 can search the corresponding power factor value PF and the corresponding efficiency value EFF in Table 1 according to the voltage value K2 and the current value K3 of the lookup table T1. For example, when the voltage value K2 is 80V and the current value K3 is 80 mA, the corresponding power factor value PF is 0.87 and the corresponding efficiency value EFF is 80%. The driver 100 can calculate the load side power value P1, the active power value P2 and the apparent power value P3 according to the formulas described above.

TABLE 1

| | K1: 100 V-150 V | | | | |
|---|---|---|---|---|---|
| | K2: 80 V | | ... | K2: 200 V | |
| K3 | PF | EFF (%) | ... | PF | EFF (%) |
| 100 mA | 0.82 | 78 | ... | 0.96 | 73 |
| 150 mA | 0.87 | 80 | ... | 0.98 | 79 |
| 200 mA | 0.91 | 81 | ... | 0.97 | 81 |
| ... | ... | ... | ... | ... | ... |
| 1400 mA | 0.99 | 89 | ... | 0.99 | 93 |

In some embodiments, the voltage value and the current value of the lookup table T1 shown by Table 1 can be voltage value ranges and current value ranges. For example, as shown in Table 1, a range of the current value K3 corresponding to 100 mA is 76 mA-125 mA, a range of the current value K3 corresponding to 150 mA is 126 mA-175 mA, and so on. Therefore, the corresponding power factor value PF and the corresponding efficiency value EFF can be found for the voltage value ranges of the voltage value K2 and the current value ranges of the current value K3. For example, when the voltage value K2 is 90V and the current value K3 is 125 mA, the corresponding power factor value PF is 0.82 and the corresponding efficiency value EFF is 78%.

As described above, in embodiments of the present disclosure, the driver 100 used in a system (for example, an intelligence light control system) doesn't need additional design of an electric meter or installation of an electric meter at the external of the system. Corresponding lookup tables are found by the controller 140 (for example, a MCU) according to the voltage signal VIN received by the power converter 110. The load side power value P1, the active power value P2 and the apparent power value P3 are calculated according to the voltage signal VOUT and the current signal IOUT which are provided to a load of the system, and the corresponding power factor value PF and the corresponding efficiency value EFF in the corresponding lookup table. The electric power consumption (that is, the electric power consumption of the load) of the system is estimated by the load side power value P1, the active power value P2 and the apparent power value P3. Therefore, the embodiments of the present disclosure have lower costs comparing to some previous approaches.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driver configured to provide an output voltage and an output current to a load according to an input voltage, the driver comprising:
    a power converter configured to receive the input voltage and convert the input voltage to the output voltage and the output current;
    a first detecting device configured to detect the input voltage to generate a first signal;
    a second detecting device configured to detect the output voltage to generate a second signal, and detect the output current to generate a third signal; and
    a controller configured to perform a calculation to the second signal and the third signal according to one of lookup tables corresponding to the first signal, to generate at least one power value,
    wherein the controller is further configured to select the one of lookup tables, and search at least one of a plurality of efficiency values and a plurality of power factor values in the one of lookup table, and
    the plurality of efficiency values and the plurality of power factor values are measured by a standard apparatus in advance.

2. The driver of claim 1, wherein each of the lookup tables includes a voltage range value corresponding to the first signal, and the plurality of efficiency values and the plurality of power factor values corresponding to the second signal and the third signal.

3. The driver of claim 2, wherein the controller is configured to obtain the one of the lookup tables according to a voltage value corresponding to the first signal, and configured to calculate an active power value and/or an apparent power value according to a corresponding one of the efficiency values and/or a corresponding one of the power factor values of the second signal and the third signal in the one of the lookup tables.

4. The driver of claim 1, wherein the power converter comprises a primary side portion and a secondary side portion, wherein the controller is configured at the secondary side portion, and the first detecting device is an isolated element and the second detecting device is a non-isolated element.

5. The driver of claim 1, wherein the power converter comprises a primary side portion and a secondary side portion, wherein the controller is configured at the primary side portion, and the first detecting device is a non-isolated element and the second detecting device is an isolated element.

6. The driver of claim 1, wherein the first detecting device comprises a pulse width modulation circuit, wherein the pulse width modulation circuit is configured to sample the input voltage to generate a sampling voltage, and configured to convert the sampling voltage to the first signal having pulses.

7. The driver of claim 1, wherein the controller comprises:
    a memory configured to store the lookup tables, wherein the lookup tables are established by the efficiency values and the power factor values corresponding to different output voltages and different output currents generated under different input voltages of the driver.

8. An operating method of a driver, comprising:
    converting an input voltage to an output voltage and an output current by the driver;
    driving a load by the output voltage and the output current;
    detecting the input voltage, the output voltage and the output current;
    generating a first signal, a second signal and a third signal corresponding to the input voltage, the output voltage and the output current, respectively;
    selecting a first lookup table in a plurality of lookup tables according to the first signal;
    searching in the first lookup table according to the second signal and the third signal, to generate at least one power value; and
    measuring efficiency values and power factor values,
    wherein selecting the first lookup table in the plurality of lookup tables comprises:
        selecting one of the lookup tables as the first lookup table; and
    searching in the first lookup table to generate the at least one power value comprises:
        searching at least one of the efficiency values and the power factor values in the first lookup table.

9. The operating method of claim 8, wherein selecting the first lookup table in the plurality of lookup tables further comprises:
    comparing a voltage value range included in each of the lookup tables and a voltage value corresponding to the first signal; and
    selecting the one of the lookup tables as the first lookup table when the voltage value in the voltage value range of the one of the lookup tables.

10. The operating method of claim 8, wherein searching in the first lookup table to generate the at least one power value further comprises:
    searching the at least one of the efficiency values and the power factor values in the first lookup table according to a voltage value corresponding to the second signal and a current value corresponding to the third signal; and
    performing calculation to the at least one of the efficiency values and the power factor values to generate at least one of an active power value and an apparent power value.

11. The operating method of claim 8, further comprising:
    measuring the efficiency values and the power factor values corresponding to different output voltages and different output currents generated under different input voltages of the driver by a standard apparatus in advance; and
    establishing the lookup tables according to the efficiency values and the power factor values.

12. A light source system, comprising:
    a light emitting diode string; and
    a driver coupled to the light emitting diode string, and configured to receive an input voltage to provide an output voltage and an output current to drive the light emitting diode string, the driver comprising:
- a power converter configured to receive the input voltage and convert the input voltage to the output voltage and the output current;
- a first detecting device configured to detect the input voltage to generate a first signal;
- a second detecting device configured to detect the output voltage to generate a second signal, and detect the output current to generate a third signal; and
- a controller configured to perform a calculation to the second signal and the third signal according to one of lookup tables corresponding to the first signal, to generate at least one power value,
- wherein the controller is further configured to select the one of lookup tables, and search at least one of a plurality of efficiency values and a plurality of power factor values in the one of lookup table, and
- the plurality of efficiency values and the plurality of power factor values are measured by a standard apparatus in advance.

13. The light source system of claim 12, wherein each of the lookup tables includes a voltage range value corresponding to the first signal, and the plurality of efficiency values and the plurality of power factor values corresponding to the second signal and the third signal.

14. The light source system of claim 12, wherein the controller is configured to obtain the one of the lookup tables according to a voltage value corresponding to the first signal, and configured to calculate an active power value and/or an apparent power value according to a corresponding one of the efficiency values and/or a corresponding one of the power factor values of the second signal and the third signal in the one of the lookup tables.

15. The light source system of claim 12, wherein the first detecting device comprises a pulse width modulation circuit, wherein the pulse width modulation circuit is configured to sample the input voltage to generate a sampling voltage, and configured to convert the sampling voltage to the first signal having pulses.

16. The light source system of claim 12, wherein the controller comprises:
- a memory configured to store the lookup tables, wherein the lookup tables are established by the efficiency values and the power factor values corresponding to different output voltages and different output currents generated under different input voltages of the driver.

* * * * *